United States Patent [19]

Drent

[11] Patent Number: 5,369,074
[45] Date of Patent: * Nov. 29, 1994

[54] CATALYST COMPOSITION FOR POLYMERIZING CARBON MONOXIDE AND ETHYLENICALLY UNSATURATED HYDROCARBONS

[75] Inventor: Eit Drent, Amsterdam, Netherlands
[73] Assignee: Shell Oil Company, Houston, Tex.
[ * ] Notice: The portion of the term of this patent subsequent to Nov. 30, 2010 has been disclaimed.
[21] Appl. No.: 76,037
[22] Filed: Jun. 15, 1993

Related U.S. Application Data

[62] Division of Ser. No. 922,284, Jul. 30, 1992, Pat. No. 5,247,064.

[30] Foreign Application Priority Data

Aug. 6, 1991 [NL] Netherlands ............... 9101351

[51] Int. Cl.$^5$ ............... B01J 31/34; C08G 67/02
[52] U.S. Cl. ............... 502/162; 502/168; 502/170; 528/392
[58] Field of Search ............... 502/162, 168, 170

[56] References Cited

U.S. PATENT DOCUMENTS

| | | | |
|---|---|---|---|
| 4,778,876 | 10/1988 | Doyle et al. | 528/392 |
| 4,882,417 | 11/1989 | Geuze | 528/392 |
| 4,914,183 | 4/1990 | Geuze et al. | 528/392 |
| 4,950,703 | 8/1990 | Smutny | 524/327 |
| 5,247,064 | 9/1993 | Drent | 502/162 |
| 5,266,545 | 11/1993 | Klusener et al. | 502/162 |
| 5,292,699 | 3/1994 | Drent | 502/162 |

FOREIGN PATENT DOCUMENTS

| | | |
|---|---|---|
| 0121965 | 10/1984 | European Pat. Off. . |
| 0257663 | 3/1988 | European Pat. Off. . |
| 0305011 | 3/1989 | European Pat. Off. . |
| 0336459 | 10/1989 | European Pat. Off. . |
| 0440997 | 8/1991 | European Pat. Off. . |

*Primary Examiner*—Asok Pal

[57] ABSTRACT

Linear alternating polymer of carbon monoxide and at least one ethylenically unsaturated hydrocarbon of relatively high bulk density is produced by contacting the carbon monoxide and hydrocarbon under polymerization conditions in the presence of a reaction diluent and a catalyst composition formed from a compound of palladium, at least 5 mols per mol of palladium of strong, non-hydrohalogenic acid and a bidentate ligand of phosphorus wherein each monovalent phosphorus substituent is characterized by a carbon atom having no more than one hydrogen substituent, which carbon atom is connected to the phosphorus by a methylene group.

8 Claims, No Drawings

CATALYST COMPOSITION FOR POLYMERIZING CARBON MONOXIDE AND ETHYLENICALLY UNSATURATED HYDROCARBONS

This is a division of application Ser. No. 922,284, filed Jul. 30, 1992, now U.S. Pat. No. 5,247,064.

FIELD OF THE INVENTION

This invention relates to an improved process for the production of linear alternating polymers. More particularly, the invention relates to an improved process for the production of linear alternating polymers of carbon monoxide and at least one ethylenically unsaturated hydrocarbon and to a novel catalyst composition useful in the process.

BACKGROUND OF THE INVENTION

The production of linear alternating polymers of carbon monoxide and at least one ethylenically unsaturated hydrocarbon is well known in the art. Such polymers, also known as polyketones or polyketone polymers, are broadly represented by the repeating formula

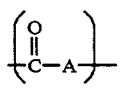 (I)

wherein A is the moiety of at least one ethylenically unsaturated hydrocarbon polymerized through the ethylenic unsaturation thereof. The scope of the process of producing the polyketone polymers is extensive, but the process typically employs a catalyst composition formed from a compound of a Group VIII metal, a strong non-hydrohalogenic acid and a bidentate ligand of phosphorus, arsenic, antimony, nitrogen or sulfur. See, for example, the processes disclosed by U.S. Pat. No. 4,950,703 and U.S. Pat. No. 4,778,876. Without wishing to be limited, a preferred catalyst composition is formed from a compound of palladium, the strong non-hydrohalogenic acid and a bidentate ligand of phosphorus. The particular components of the catalyst composition, as well as the particular polymerization conditions, will determine to some extent the particular properties of the resulting polymer.

One property that is particularly significant in the preparation, recovery and transportation of the polyketone polymer is its bulk density, i.e., the weight of polymer per unit volume. In many embodiments of polyketone production, the polymer is obtained as a suspension of polymer in the liquid reaction diluent employed in the polymerization process. In such instances, the maximum concentration of the polymer in the polymer suspension is directly related to the bulk density of the polymer. In the preparation of a polymer product having a bulk density of about 100 kg/m$^3$ the maximum concentration of polymer in the polymer suspension is about 10% by weight. In contrast, in the preparation of a polyketone polymer having a bulk density of about 500 kg/m$^3$, the maximum concentration is about 50% by weight. Thus, production of polyketone polymer of higher bulk density permits the production of more polymer per unit of reactor volume.

In these process embodiments, the polymer product is generally recovered by procedures which separate the polymer suspension into solid polyketone polymer and a liquid generally comprising the reaction diluent including soluble impurities. The separation is somewhat incomplete and in the case of polyketone polymer having a bulk density of about 100 kg/m$^3$, about 5 grams of liquid remain adhered to each gram of polyketone polymer product. In the recovery of a polyketone polymer having a bulk density of about 500 kg/m$^3$, the quantity of adhering liquid is about 0.25 gram per gram of polymer. Other advantages accrue to the production of polyketone polymer of relatively high bulk density.

The production of polymer of relatively high bulk density is known, being disclosed for example in U.S. Pat. No. 4,882,417 and U.S. Pat. No. 4,914,183. It would be of advantage, however, to have an improved process for the production of linear alternating polymer of carbon monoxide and at least one ethylenically unsaturated hydrocarbon of relatively high bulk density.

SUMMARY OF THE INVENTION

The present invention provides an improved process for the production of linear alternating polymers of carbon monoxide and at least one ethylenically unsaturated hydrocarbon, as well as a novel catalyst composition useful in that process. More particularly, the invention provides such an improved process for producing such a polymer of relatively high bulk density. The process employs a catalyst composition formed from a compound of palladium, a specified quantity of strong non-hydrohalogenic acid and a bidentate ligand of phosphorus wherein the monovalent phosphorus substituents are of defined structure.

DESCRIPTION OF THE INVENTION

The olefinically unsaturated hydrocarbons useful as precursors of the linear alternating polymers have up to 20 carbon atoms inclusive, preferably up to 10 carbon atoms inclusive. These hydrocarbons are illustrated by aliphatic hydrocarbons including ethylene and other α-olefins such as propylene, 1-butene, isobutylene, 1-hexene, 1-octene and 1-dodecene, as well as by arylaliphatic hydrocarbons containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene, and m-isopropylstyrene. The preferred polyketone polymers are copolymers of carbon monoxide and ethylene or are terpolymers of carbon monoxide, ethylene and a second ethylenically unsaturated hydrocarbon of at least 3 carbon atoms, particularly an α-olefin such as propylene. Copolymers of carbon monoxide and ethylene are especially preferred.

When the preferred terpolymers are produced according to the process of the invention, there will be within the terpolymer at least about 2 units incorporating a moiety derived from ethylene for each unit derived from the second hydrocarbon. Preferably these will be from about 10 units to about 100 units incorporating a moiety derived from ethylene for each unit derived from the second hydrocarbon. The polymer chain of the preferred polyketone polymers is therefore represented by the repeating formula

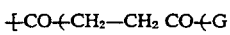 (II)

wherein G is a moiety derived from at least one ethylenically unsaturated hydrocarbon of at least 3 carbon atoms polymerized through the ethylenic unsaturation and the ratio of y:x is no more than about 0.5. When copolymers of carbon monoxide and ethylene are produced by the process of the invention, there will be no second hydrocarbon present and the copolymers are represented by the above formula (II) wherein y is zero. When y is other than zero, i.e., terpolymers are produced, the —CO—(—CH$_2$—CH$_2$)— units and the —CO—(—G—)— units are found randomly throughout the polymer chain and the preferred ratios of y:x are from about 0.01 to about 0.1. The end groups or "caps" of the polymer chain will depend upon what materials were present during the production of the polymer and whether and how the polymer was purified. The precise nature of the end groups does not appear to have any substantial effect on the properties so that the polymers are fairly depicted by the above formula for the polymer chain.

Of particular interest are the polyketone polymers of number average molecular weight from about 1000 to about 200,000 as determined by gel permeation chromatography. The physical properties of the polymer will depend in part on the molecular weight, whether the polymer is a copolymer or a terpolymer and, in the case of terpolymers, the nature of and the proportion of the second hydrocarbon present. Typical melting points for the polymers are from about 175° C. to about 300° C. The polymers have a limiting viscosity number, measured in cresol at 60° C. in a standard capillary viscosity measuring device, of from about 0.5 dl/g to about 10 dl/g.

The polymerization is conducted by contacting the monomers and the catalyst composition under polymerization conditions in the presence of a liquid reaction diluent. Although, as stated, a variety of catalyst compositions will effectively produce polyketone polymers, the process of the invention to produce polyketone polymers of relatively high bulk density requires a particular catalyst composition. The catalyst composition of the invention is formed from a compound of palladium, at least a minimum amount of non-hydrohalogenic acid having a pKa below 2 (as measured in water at 18° C.) and a bidentate ligand of phosphorus wherein the monovalent phosphorus substituents are of defined structure. The compound of palladium is preferably a palladium carboxylate and palladium acetate, palladium propionate, palladium butyrate and palladium hexanoate are suitable. Palladium acetate is particularly preferred.

The non-hydrohalogenic acid of pKa below 2 is usefully an inorganic acid such as sulfuric acid or perchloric acid or alternatively is an organic acid including carboxylic acids such as dichloroacetic acid, trichloroacetic acid and/or trifluoroacetic acid or a sulfonic acid such as methanesulfonic acid, p-toluenesulfonic acid or trifluoromethanesulfonic acid. Trifluoroacetic acid, p-toluenesulfonic acid and trifluoromethanesulfonic acid are preferred. The quantity of acid employed is at least about 5 mols but less than about 100 mols of strong non-hydrohalogenic acid per mol of palladium (as the compound). Preferably the quantity of the strong acid will be from about 10 mols to about 50 mols of acid per mol of palladium.

The bidentate ligand of phosphorus employed in the catalyst compositions of the invention is represented by the formula

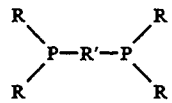

wherein R' is a divalent hydrocarbon bridging group of up to 10 carbon atoms inclusive with from 2 to 4 carbon atoms inclusive in the phosphorus-phosphorus bridge between the phosphorus atoms. Illustrative R' groups include 1,2-ethylene, 1,3-propylene, 1,3-butylene, 2,2-dimethyl-1,3-propylene and 2,2,3,3-tetramethyl-1,3-butylene. Preferred as the R' group is 1,3-propylene. The monovalent phosphorus substituents, R, are independently characterized by up to 10 carbon atoms inclusive and by the presence of a carbon atom having no more than 1 hydrogen substituent which is directly linked to the phosphorus atom by a methylene group, i.e., a —CH$_2$— group. The R group is therefore aliphatic or arylaliphatic and is illustrated by 2-methylpropyl, 2-methylbutyl, 2,3-dimethylhexyl, benzyl, o-methoxybenzyl and p-methoxybenzyl. Preferred R groups are hydrocarbyl and aliphatic and it is further preferred that each R be the same as the other R substituents. Particularly preferred as the R group is 2-methylpropyl and the preferred bidentate ligand of phosphorus is 1,3-bis(di-2-methylpropylphosphino)propane. The quantity of bidentate phosphorus ligand is suitably from about 0.5 mol to about 2 mols per mol of palladium. Preferably, the quantity of bidentate phosphorus ligand is from about 0.75 mol to about 1.5 mol of ligand per mol of palladium.

It is useful on occasion to provide to the catalyst composition an amount of an organic oxidizing agent. Illustrative of suitable oxidizing agents are aliphatic nitrites such as butyl nitrite and amyl nitrite and aromatic nitro compounds such as nitrobenzene and 2,4-dinitrotoluene. The preferred oxidizing agent is a hydroquinone, particularly a 1,4-hydroquinone and particularly preferred are 1,4-benzoquinone and 1,4 naphthoquinone. As stated, the presence of organic oxidizing agent is not required but amounts of oxidizing agent up to about 5000 mols per mol of palladium are suitable. When oxidizing agent is present, amounts of oxidizing agent from about 10 mols to about 1000 mols per mol of palladium are preferred.

The polymerization to produce the polyketone polymer is conducted under polymerization conditions in the presence of an inert reaction diluent. Suitable reaction diluents are liquid under the conditions of polymerization and are illustrated by alkanols such as methanol and ethanol as well as by alkanones such as acetone and methyl ethyl ketone. Methanol is a preferred reaction diluent. Typical reaction conditions include a polymerization temperature of from about 20° C. to about 150° C., preferably from about 30° C. to about 130° C. The polymerization pressure is from about 2 bar to about 150 bar although pressures from about 5 bar to about 150 bar are more commonly employed. In the polymerization, ratios of carbon monoxide to total ethylenically unsaturated hydrocarbon from about 10:1 to about 1:10 are suitable although ratios from about 5:1 to about 1:5 are preferred. The catalyst composition is provided to the polymerization mixture in a catalytic quantity. Such quantities are sufficient to provide from about $1 \times 10^{-7}$ mol to about $1 \times 10^{-3}$ mol of palladium per mol of total ethylenically unsaturated hydrocarbon. Preferably, sufficient catalyst composition is employed to provide from about $1\times10^{-6}$ mol to about $1\times10^{-4}$ mol of palladium per mol of total ethylenically unsaturated hydrocarbon.

The polymerization is conducted by charging to a suitable reactor the monomer, catalyst composition and reaction diluent. Reactant contact with the catalyst composition is facilitated by some means of agitation such as shaking or stirring. Subsequent to polymerization, the reaction is terminated as by cooling the reactor and contents and releasing the pressure. The polyketone polymer is typically obtained as a product substantially soluble in the reaction diluent and the product is recovered by conventional methods such as filtration or decantation. The polyketone polymer is used as recovered or is purified by contact with a solvent or extraction agent which is selective for catalyst residues.

The polyketone polymers are premium thermoplastic polymers and are useful in applications conventional for thermoplastic polymers. They are processed by conventional methods such as extrusion, injection molding and thermoforming into shaped articles of established utility. Particular applications include the production of containers for food and drink and the production of parts and housings for automotive applications.

The invention is further illustrated by the following Comparative Examples (not of the invention) and the Illustrative Embodiments which should not be regarded as limiting. Each the carbon monoxide/ethylene polymers was examined by $^{13}$C-NMR and found to be a linear copolymer with alternating units derived from carbon monoxide and from ethylene.

COMPARATIVE EXAMPLE I

A copolymer of carbon monoxide and ethylene was produced by charging to a 250 ml autoclave equipped with a mechanical stirrer a catalyst composition solution formed from 50 ml methanol, 0.1 mmol palladium acetate, 2 mmol p-toluenesulfonic acid and 0.12 mmol 1,3-bis(diphenylphosphino)propane. Ethylene was added to give a pressure of 20 bar and carbon monoxide was added to provide a total pressure of 50 bar. The contents of the autoclave were then heated to 70° C. After 1 hour, the polymerization was terminated by cooling the reaction mixture to ambient temperature and releasing the pressure. The polymer product was recovered by filtration, washed with methanol and dried. The yield of copolymer was 14 g and the copolymer had a bulk density of 230 kg/m$^3$.

COMPARATIVE EXAMPLE II

A carbon monoxide/ethylene copolymer was produced by a procedure substantially similar to that of Comparative Example I except that the catalyst composition solution contained 0.3 mmol of trifluoromethanesulfonic acid instead of p-toluenesulfonic acid and 0.12 mmol of 1,3-bis-(diethylphosphino) propane instead of 1,3-bis(diphenylphosphino)propane. The yield of copolymer was 14 g and the copolymer had a bulk density of 200 kg/m$^3$.

COMPARATIVE EXAMPLE III

A copolymer of carbon monoxide and ethylene was produced by a procedure substantially similar to that of Comparative Example II except that the catalyst composition solution contained 2 mmol of trifluoroacetic acid instead of trifluoromethanesulfonic acid and the reaction time was 3 hours instead of 1 hour. The yield of copolymer was 12 g and the copolymer had a bulk density of 280 kg/m$^3$.

COMPARATIVE EXAMPLE IV

A carbon monoxide/ethylene copolymer was produced by a procedure substantially similar to that of Comparative Example I except that the catalyst composition solution contain 0.12 mmol of 1,3-bis(dibutylphosphino)propane instead of 1,3-bis-(diphenylphosphino)propane and the reaction time was 5 hours instead of 1 hour. The yield of copolymer was 14 g and the copolymer had a bulk density of 200 kg/m$^3$.

COMPARATIVE EXAMPLE V

A copolymer of carbon monoxide and ethylene was produced by a procedure substantially similar to that of Comparative Example I except that the catalyst composition contained 2 mmol trifluoroacetic acid instead of p-toluenesulfonic acid and 0.12 mmol of 1,3-bis(di-2-propylphosphino)propane instead of 1,3-bis(diphenylphosphino)propane and the reaction time was 5 hours instead of 1 hour. The yield of copolymer was 12.5 g and the copolymer had a bulk density of 220 kg/m$^3$.

COMPARATIVE EXAMPLE VI

A carbon monoxide/ethylene copolymer was produced by a procedure substantially similar to that of Comparative Example I except that 2 mmol trifluoroacetic acid was employed instead of p-toluenesulfonic acid, 0.12 mmol 1,3-bis(dibutylphosphino)propane was employed instead of 1,3-bis(diphenylphosphino) propane and the reaction time was 3 hours instead of 1 hour. The yield of copolymer was 10 g and the copolymer had a bulk density of 200 kg/m$^3$.

COMPARATIVE EXAMPLE VII

A copolymer of carbon monoxide and ethylene was produced by a procedure substantially similar to that of Comparative Example I except that 0.3 mmol of trifluoromethanesulfonic acid, 0.12 mmol of 1,3-bis(di-2-methylpropylphosphino)propane was employed instead of 1,3-bis (diphenylphosphino)propane and the reaction time was 2 hours instead of 1 hour. The yield of copolymer was 13 g and the copolymer had a bulk density of 200 kg/m$^3$.

ILLUSTRATIVE EMBODIMENT I

A copolymer of carbon monoxide and ethylene was produced by a procedure substantially similar to that of Comparative Example I except that 2 mmol of trifluoroacetic acid was employed instead of p-toluenesulfonic acid and 0.12 mmol of 1,3-bis(di-2-methylpropylphosphino) propane was employed instead of 1,3-bis(diphenylphosphino)propane and the reaction time was 5 hours instead of 1 hour. The yield of copolymer was 12.5 g and the copolymer had a bulk density of 460 kg/m$^3$.

ILLUSTRATIVE EMBODIMENT II

A carbon monoxide/ethylene copolymer was produced by a procedure substantially similar to that of Comparative Example I except that 2 mmol of trifluoroacetic acid was employed instead of p-toluenesulfonic acid and 0.12 mmol of 1,3-bis(debenzylphophino)propane was employed instead of 1,3-bis(diphenylphosphino)propane and the reaction time was 5 hours instead of 1 hour. The yield of copolymer was 10 g and the copolymer had a bulk density of 450 kg/m$^3$.

ILLUSTRATIVE EMBODIMENT III

A carbon monoxide/ethylene copolymer was produced by a procedure substantially similar to that of Comparative Example I except that 0.12 mmol of 1,3-bis(di-2-methylpropylphosphino)propane was employed instead of 1,3-bis(diphenylphosphino)propane and the reaction time was 2 hours instead of 1 hour. The yield of copolymer was 14 g and the copolymer had a bulk density of 470 kg/m$^3$.

ILLUSTRATIVE EMBODIMENT IV

A copolymer of carbon monoxide and ethylene was produced by a procedure substantially similar to that of Comparative Example I except that the catalyst composition solution contained 2 mmol of trifluoromethanesulfonic acid instead of p-toluenesulfonic acid and 0.12mmol of 1,3-bis(di-2-methylpropylphosphino)propane instead of 1,3-bis (diphenylphosphino)propane. The yield of copolymer was 14 g and the copolymer had a bulk density of 480 kg/m$^3$.

What is claimed is:

1. A catalyst composition formed from a compound of palladium, at least 5 mols per mol of palladium of a non-hydrohalogenic acid having a pKa below 2 and a bidentate ligand of phosphorus wherein each monovalent phosphorus substituent is characterized by having up to 10 carbon atoms inclusive and by the presence of a carbon atom having no more than 1 hydrogen substituent which is directly linked to the phosphorus atom by a methylene group.

2. The composition of claim 1 wherein the compound of palladium is palladium acetate.

3. The composition of claim 1 wherein the bidentate ligand of phosphorus is of the formula

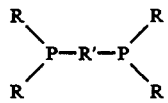

wherein R independently has up to 10 carbon atoms and has a carbon atom with no more than one hydrogen substituent, which carbon atom is connected to the phosphorus by a methylene group, and R' is a divalent bridging group of up to 10 carbon atoms inclusive with from 2 to 4 carbon atoms inclusive in the bridge.

4. The composition of claim 1 wherein the quantity of acid is from about 10 mols to about 50 mols per mol of palladium.

5. The composition of claim 3 wherein R' is 1,3 propylene.

6. The composition of claim 4 wherein the acid is trifluoroacetic acid, p-toluenesulfonic acid or trifluoromethanesulfonic acid.

7. The composition of claim 6 wherein R is benzyl.

8. The composition of claim 6 wherein R is 2-methylpropyl.

* * * * *